(12) United States Patent
Broughton, Jr. et al.

(10) Patent No.: US 9,378,865 B2
(45) Date of Patent: Jun. 28, 2016

(54) HIGH STRENGTH TETHER FOR TRANSMITTING POWER AND COMMUNICATIONS SIGNALS

(71) Applicants: Royall M. Broughton, Jr., Opelika, AL (US); David John Branscomb, Sheffield, AL (US); David G. Beale, Auburn, AL (US)

(72) Inventors: Royall M. Broughton, Jr., Opelika, AL (US); David John Branscomb, Sheffield, AL (US); David G. Beale, Auburn, AL (US)

(73) Assignee: THREE BEES BRAIDING, LLC., Auburn, AL (US)

(*) Notice: Subject to any disclaimer, the term of this patent is extended or adjusted under 35 U.S.C. 154(b) by 103 days.

(21) Appl. No.: 14/218,748

(22) Filed: Mar. 18, 2014

(65) Prior Publication Data

US 2014/0262428 A1   Sep. 18, 2014

Related U.S. Application Data

(60) Provisional application No. 61/793,742, filed on Mar. 15, 2013.

(51) Int. Cl.
| | | |
|---|---|---|
| *H01B 7/00* | (2006.01) | |
| *H01B 7/04* | (2006.01) | |
| *G02B 6/44* | (2006.01) | |
| *B64G 1/64* | (2006.01) | |
| *B64C 39/02* | (2006.01) | |

(52) U.S. Cl.
CPC ............ *H01B 7/043* (2013.01); *B64G 1/648* (2013.01); *G02B 6/4417* (2013.01); *B64C 39/022* (2013.01); *Y10T 29/49826* (2015.01)

(58) Field of Classification Search
CPC .............. H01B 7/043; F05B 2240/917; F05B 2240/922; F05B 2240/921; F03E 11/00; Y02E 10/722; Y02E 10/728
USPC .......... 174/102 R, 106 R, 108, 102 SP, 27, 36
See application file for complete search history.

(56) References Cited

U.S. PATENT DOCUMENTS

| | | | | |
|---|---|---|---|---|
| 3,126,442 A * | 3/1964 | Roberts | .................... | H01B 7/06 174/113 C |
| 3,980,808 A * | 9/1976 | Kikuchi | ................ | H01B 7/182 174/102 E |
| 4,196,307 A * | 4/1980 | Moore | ................ | H01B 7/0072 174/116 |
| 4,312,260 A * | 1/1982 | Morieras | ................... | D07B 1/04 174/121 R |
| 4,365,865 A * | 12/1982 | Stiles | ................... | G02B 6/4416 174/70 R |
| 4,486,669 A * | 12/1984 | Pugh | ........................ | B64B 1/50 244/154 |
| 4,975,543 A * | 12/1990 | Saunders | ................. | B64D 3/02 114/253 |
| 5,120,905 A * | 6/1992 | Cousin | .................. | H01B 7/182 174/113 C |

(Continued)

FOREIGN PATENT DOCUMENTS

WO    2011149463 A1    12/2011

*Primary Examiner* — William H Mayo, III
(74) *Attorney, Agent, or Firm* — Dowell & Dowell, PC

(57) ABSTRACT

An electro-optical-mechanical tether to transmit both optical signals and electricity to and from airborne and other movable devices from a base structure, in which the tether includes a mechanical strengthening core covered by a first intermediate compressive layer which is helically wrapped by a plurality of electrical and fiber optic conductors, which constitute an second intermediate layer of the tether, and a outer protective layer.

19 Claims, 2 Drawing Sheets

(56) References Cited

U.S. PATENT DOCUMENTS

| | | | |
|---|---|---|---|
| 5,456,697 A | 10/1995 | Chesterfield et al. | |
| 5,495,547 A | 2/1996 | Rafie et al. | |
| 6,424,768 B1 * | 7/2002 | Booth | G02B 6/4427 174/116 |
| 6,898,354 B2 | 5/2005 | Kim et al. | |
| 8,921,698 B2 * | 12/2014 | Vander Lind | F03D 5/00 174/102 R |
| 2009/0289148 A1 * | 11/2009 | Griffith | B63H 9/0685 244/155 R |
| 2010/0052203 A1 | 3/2010 | Inazawa et al. | |
| 2012/0070122 A1 | 3/2012 | Lind | |
| 2012/0186851 A1 * | 7/2012 | Winterhalter | H01B 5/105 174/113 C |

* cited by examiner

HIGH STRENGTH TETHER FOR TRANSMITTING POWER AND COMMUNICATIONS SIGNALS

BACKGROUND OF THE INVENTION

1. Field of the Invention

This invention relates to a strong, lightweight tether or electro-optical-mechanical (EOM) cable. The tether is designed and primarily used for applications relating to airborne devices, specifically to attach the airborne device to the ground or a structure or vehicle on the ground while also performing other functions. Some of the functions include electrical power transmission either to the airborne device or from the airborne device if it includes a power generator. Electrical wires in the tether also allow for communication via electrical signals, although it is preferred to use the embedded optical fibers for communication. The tether may be used to send control commands to the airborne device, receive feedback from the airborne device, receive, detect or broadcast transmissions or collect surveillance and send it to the ground. The tether also exhibits other features including high strength and light weight, which make it ideal for use in aerospace applications, including electrodynamic tethers on spacecraft. The tether can also be used in other applications that require strength along with electrical and optical signal transmission.

2. Description of Related Art

Some tethers comprise only a single line. A single-line tether has limited functionality, and is prone to failure. Improvement has been shown by using multiple lines to produce the tether, which increases the strength as well as providing for the survival of the tether even if one line is broken (U.S. Pat. Nos. 6,116,544 and 6,431,497). In the referenced patents, the several lines comprising the tether are of the same material, providing an increase in strength and reliability but not in functionality. These prior art tethers are designed for conducting electricity and thus contain metal conductors. While these patents do not indicate specifically where the conductive wires are located, they do disclose metal and glass in the braided yarns. Further, the tether disclosed in U.S. Pat. No. 6,431,497 stretches a lot because the load bearing yarns are braided rather than being straight for the length of the tether.

For some applications, the materials required to function in a specific way are not strong enough to form a tether without reinforcement. These include optical fibers and electric wires. In order to make a tether capable of transmitting signals or electrical power, it is necessary to include strong fibers, so that the integrated tether is stronger than the optical fibers or electrical conductors. These strength members typically have a higher strain at failure than either electrical or fiber optic strands. To overcome this strain inequality, typical fiber optic cables are overloaded with high performance fibers to prevent strain and the accompanying conductor failure, as seen in U.S. Pat. No. 6,325,330. However, this approach fails to use the strength of the high performance fiber efficiently. The geometry of the current invention allows the strength members to be efficient in load bearing, while conductors elongate without failure using geometric form strain rather than material strain.

BRIEF SUMMARY OF THE INVENTION

The present invention is a tether that utilizes a number of high performance fibers as strength-providing members. Additionally, multiple insulated metal wires, perhaps one uninsulated bleed/ground wire and at least one fiber optic cable are integrated into the tether for transmission of electrical power and optical signals. The novel arrangement of the different components allows for an efficient structure, with a high strength and low weight, in which the effective strain at failure of the signal conducting components is less than or equal to the failure strain of the entire tether. Said differently, the geometry of the current invention allows the strength members to be efficient in load bearing, while conductors elongate without failure using geometric form strain rather than material strain.

The tether of this invention includes a core of strength members, a compaction layer, fiber optic and electrical conductors, and an abrasion resistant outer layer. The core may be straight, twisted, or in a rope configuration. The preferred embodiment is a twist level low enough to maintain strength and strain to failure, but sufficient to prevent filament separation during winding. The subsequent concentric layers may be braided or wrapped around the core. The preferred embodiment is braiding. The design motivation for the tether is to contain both electrical wires and fiber optic strands, and yet be extremely strong and lightweight.

The unique arrangement of the cable of the present invention provides a tether that is more easily deployable and reeled in than a conventional net structure. Further, the tether of the present invention may be manufactured by conventional machinery, namely a maypole braider.

In order to reduce the weight compared to the prior art, the present invention reduces the amount of reinforcing material. The strength members are entirely located in the core of the tether, which may be straight, twisted, or in a rope configuration. The result is that, rather than being shielded from straining, it is expected that the electrical wires and optical fibers will strain with the tether.

High strength fibers are able to withstand high tension and a higher strain than electrical and optical conductors. This invention arranges the conductors such that they will strain with the tether, but without failing. This is accomplished by the helical arrangement of these components, which allows them to undergo geometric form strain rather than axial material strain.

The tether is also designed to minimize the crimp experienced by the conductors. This is accomplished by placing all the conductors parallel to one another. As stated, the conductors are arranged helically around the tether, preferably by braiding. The conductors are all included in the same braid, and circling the tether in the same direction. This arrangement prevents them from interlacing or crossing one another, and reduces crimp. Furthermore, the cross yarns, circling in the other direction, are very thin. As a result, the cross yarn bends much more than the conductors, saving the conductors from crimp, which would otherwise cause signal loss and failure within the conductors. The resulting braid is generally designed to work well as a loose or open braid, allowing a liberal space between each wire or optical fiber. This openness particularly benefits the electrical wires, which may carry high currents and maintain high voltages. The extra space provides a greatly increased insulation from one another, and prevents arcing or short circuits in the tether even as it wears with use.

The pitch angle of the intermediate layer containing the conductors is a compromise between a low pitch dimension which provides greater form elongation (but which also increases the signal loss through bending) and a large pitch dimension which provides minimal optical signal loss (but little form strain). As stated above, the electrical and optical conductors are braided into the same layer. This requires them to be incorporated at the same pitch angle. As a result, the pitch angle is chosen taking into account both the material strain and the signal attenuation of both types of conductors. Although braiding is the preferred embodiment for this intermediate layer, it is also quite possible to wrap the layer into the same helical formation. This would prevent any of the small crimp introduced by the cross yarns, but would also require an additional layer to compact and bind the layer to the tether, and to keep the desired pitch.

The electrical conductors are held near the surface of the tether, which provides better thermal dissipation of any heat generated by electrical resistance. This can improve the electrical performance of the tether, and also keep ice from forming on the tether. An additional consequence of wrapping or braiding the wires and optical fibers is that the tether takes on the helical shape of the intermediate layer. This noncircular shape reduces the cross-section of the tether, and may actually reduce wind resistance; however, it may also be desirable to add a light filler material to achieve a more symmetrical and uniform shape.

To protect the tether for long term use in an outdoor environment and various weather conditions, an outside layer is provided, which is composed of a normal textile fiber such as polyester. The outer layer may also be coated with a polymeric coating, such as polyurethane or plasticized PVC. The outer layer functions as a protective, abrasion resistant cover for the layers below.

DETAILED DESCRIPTION OF THE INVENTION

Figure 1:
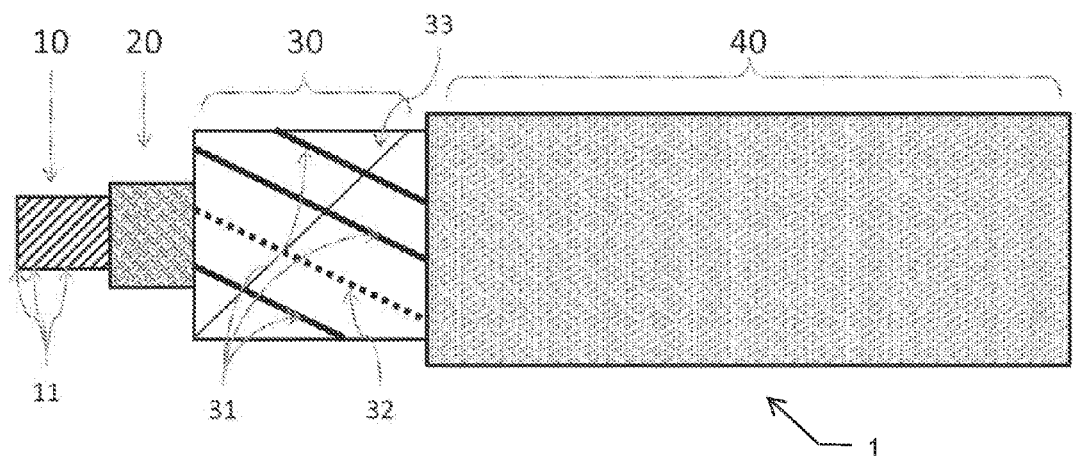
FIG. 1 illustrates a cutaway view of the tether, containing a twisted core and a braided intermediate layer.

Referring to FIG. 1, a cutaway view of a tether (1) is shown. The construction of the tether (1) begins with a core (10), made of a plurality of high-strength yarns (11), such as KEVLAR™ yarns. This core (10) is provided as the central strength member for the tether (1). The arrangement of said yarns (11) in the core (10) can vary. One possible configuration is to align all of said yarns (11) axially along the length of the tether (1) and parallel to one another. However, it is preferred to impart some twist, perhaps generating a twisted rope. There are also numerous wire rope configurations that would be suitable for this purpose. The core (10) may essentially be a strong rope, providing the basis for a strong tether. However, as stated, it is not required that the core (10) be constructed in a rope configuration. The preferred embodiment of the core (10) includes a slight twist, but this twist may not be sufficient to make a standalone rope.

Also, if a rope construction is used, the preferred embodiment of the core (10) is to twist the yarns (11) in one direction prior to construction of the core (10), and then to wrap said yarns (11) in the opposite direction, effectively removing much of the originally imparted twist. The yarns (11) are strongest when they are purely axial with no internal twist, while a twisted core (10) prevents buckling and holds the yarns (11) together. Both benefits are achieved in this manner. The core (10) can be made specifically for use in the tether, or can be a pre-fabricated rope.

Looking further at FIG. 1, the core (10) is surrounded by a compaction layer (20). The purpose of the compaction layer (20) is to bind the core (10). Left unbound, the core (10) would be susceptible to buckling, thereby reducing the overall strength of the tether. The compaction layer (20) can be generated in a variety of ways. One preferred method is to braid a number of fibers around the core (10). Another preferred and common method is to wrap a tape, or one or more yarns, around the core (10). Such a procedure is often performed while a rope is being made, and could be employed during the construction of the core (10). It is also possible to extrude a layer of material over the core (10) for the same purpose.

Continuing to look at FIG. 1, an intermediate layer (30) also surrounds the core (10). Said intermediate layer (30) may be generated by twisting or braiding. The preferred embodiment is for the intermediate layer (30) to be braided. The intermediate layer (30) is comprised of several elements. Electrical wires (31) comprise some of the braiders of said intermediate layer (30). The original preferred embodiment is to include two insulated wires (31), such as insulated copper wires, to complete a circuit for power transmission, and to add a third wire (31), which may or may not be insulated, as a bleed wire for grounding. Different numbers of electrical wires (31) may be quite easily incorporated into the design, as may be desired for parallel electrical circuits, electrical communications, or other considerations. Generally, the wires (31) are spaced as far apart as possible. The additional space between each wire (31) reduces both the need for heavy insulation and the risk of a short circuit in the tether.

Also in said intermediate layer (30), at least one optical fiber (32) may be included. Housed optical fibers may be used due to the factory connections at the ends; these fibers (32) contain some reinforcement. A more general embodiment may include some reinforcement of the optical fiber (32), but probably not as much as may be provided in the housed cable. Considerations will be made regarding the desired size, weight, and strength of the optical fiber (32); a limited reinforcement may be provided for those purposes, while maintaining a desire to reduce reinforcement and save weight.

For the sake of geometry, said optical fibers (32) are spaced among the electric wires (31). As the wires (31) and the optical fibers (32) are placed over the core to form the intermediate layer (30), they circle the core (10) in the same helical direction, either clockwise or counterclockwise. They will also circle with the same pitch angle. The desired pitch angle involves a balance. In purely axial geometry (electrical and optical conductors parallel to the tether), loading would subject the electrical and optical conductors (31-32) to a high tension and strain, leading to failure. Increasing the twist reduces axial tension, but also increases bending, which introduces strain as well and can lead to signal loss in the optical fiber (32). The resulting desired pitch angle for the intermediate layer (30) is enough to prevent failure of the conductors (31-32) in the operating range of the tether, but bending as little as possible. Consideration is taken of the wire (31) and optical fiber (32) specifications.

The preferred embodiment of the intermediate layer (30) is braiding, with the remainder of the intermediate layer (30) comprised of cross yarns (33), which may include one or more types of fiber. Generally, the type of fiber is not critical. It is important, however, that the cross yarns (33) are thin. The wires (31) and optical fibers (32) are susceptible to strain and failure if subjected to crimp. A thin cross yarn (33) will bend over and under the larger wires (31) and optical fibers (32) without causing crimping in the wires (31) and fibers (32). Braiding or twisting allows the electrical wires (31) and optical fibers (32) to comprise a strained tether, wherein the electrical wires (31) and optical fibers (32) strain as well, but with form strain rather than entirely material strain. The pitch of all the components (31-33) of the intermediate layer (30) may be optimized so that each component fails together. This results in the most efficient tether with respect to the strength vs. weight.

Finally, FIG. 1 shows an outer layer (40). This outer layer (40) is desired for abrasion resistance as well as general protection from the environment. Said outer layer (40) should be made from a material with specific properties suited for a harsh outdoor environment, such as nylon or polyester tire cord. Said material should be abrasion resistant, relatively light, ideally not absorb much water, and should not degrade in sunlight. A potentially important feature of the outer layer (40) is to provide protection from the ultraviolet light from the sun, as some high strength fibers are known to degrade due to ultraviolet exposure.

Either a braided outer layer and/or a thin extruded coating can serve as the outer layer (40). Alternatively, the outer layer (40) may be coated with a polymeric coating, such as polyurethane or plasticized PVC.

Figure 2:
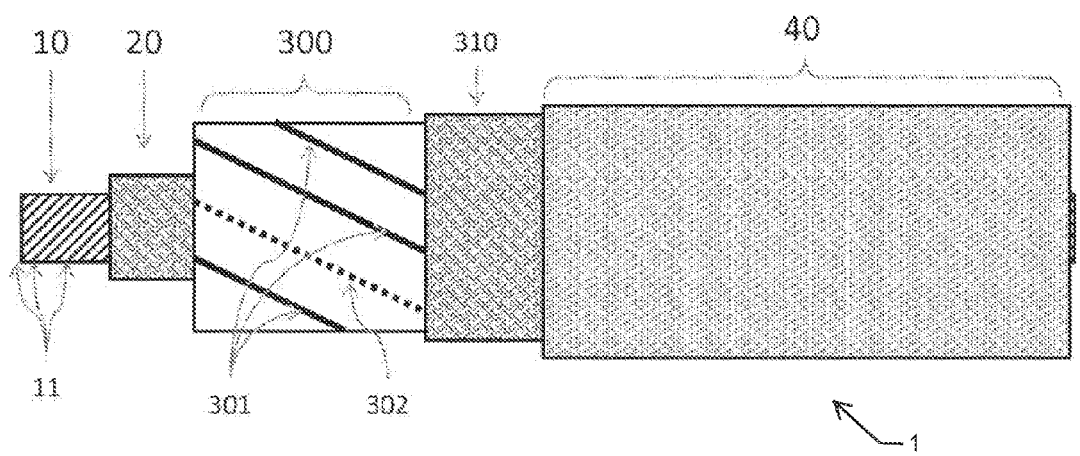
FIG. 2 illustrates a cutaway view of the tether, containing a wrapped intermediate layer.

Looking now at FIG. 2, an embodiment of the tether (1) is shown with alternative intermediate layer (300). This alternative layer (300) is wrapped, rather than braided. Examination reveals close similarity between the alternative layer (300) and the intermediate layer (30) of FIG. 1. The electric wires (301) and optical fibers (302) are the same, and arranged in the same helical shape with the same pitch. However, in the alternative intermediate layer (300), there is no braiding or interlacing. The electrical and optical conductors (301-302) are simply wrapped around the core (10) and the compacting layer (20). Wrapping is generally simpler than braiding, which could offer an advantage; however, the braided configuration shown in FIG. 1 functioned to maintain the pitch and spacing of the conductors (31-32). Without braiding, something else must be done to preserve the alternate intermediate layer (300).

Looking further at FIG. 2, a binding layer (310) is added, directly over the alternate intermediate layer (300). The binding layer (310) serves the purpose no longer met by braiding in the alternate configuration. By compressing the alternate intermediate layer (300), the binding layer (310) will keep the spacing between all of the conductors—wherein said conductors may include electrical wires (301) and/or optical fibers (302)—of the alternate intermediate layer (300) substantially constant. Also, as the tether strains, the binding layer (310) will ensure that the alternate intermediate layer (300) and particularly the conductors (301-302) strain consistently. The binding layer (310) does this without adding any crimp, which was noted above as a concern. The binding layer (310) can be added using a variety of methods, including braiding, wrapping, or extruding, but the results should be somewhat independent of the method.

Figure 3A:
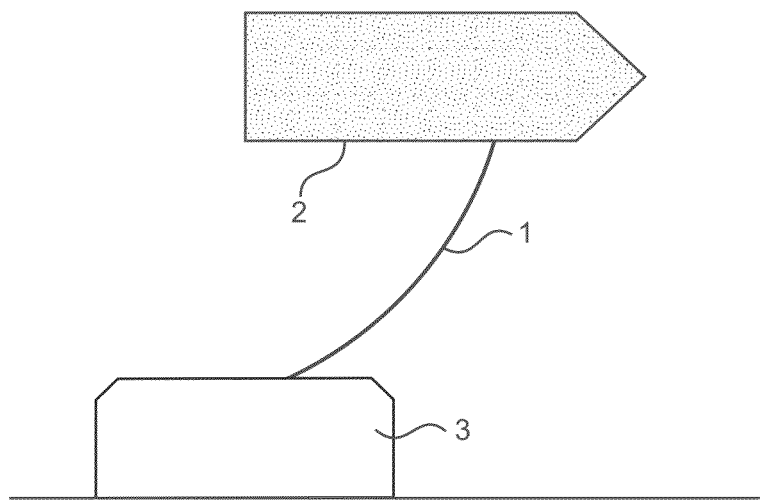
FIG. 3a shows the tether in use securing a power generating airborne device.
Figure 3B:
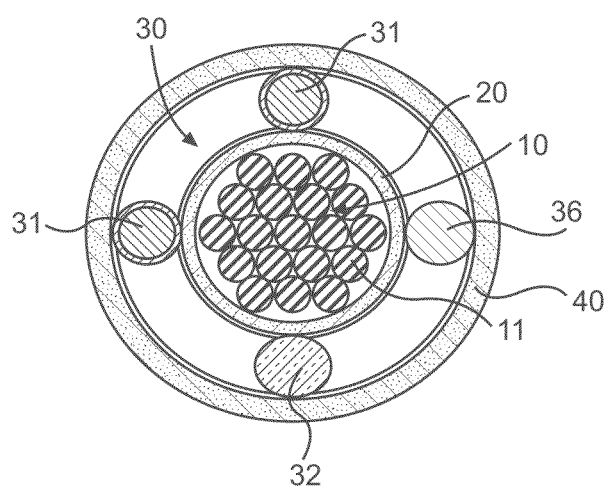
FIG. 3b shows a cross section of the tether as used.

FIG. 3a shows the tether (1) securing an airborne device (2) used for power generation to a base (3). FIG. 3b shows a cross section of the tether (1) shown in FIG. 3a. In this embodiment, two electrical wires (31) transmit the generated power, while a third wire is added as a bleed wire (36) for grounding. One optical fiber (32) is included to transmit and receive instructions and feedback between the ground and the airborne device.

Also in the embodiment of the tether (1) shown in FIG. 3b, the core (10) contains 17 yarns (11). This includes 16 fibers twisted around one axial. However, the core (10) can include any suitable number and configuration of fibers.

The compacting layer (20) is braided over the core (10). The intermediate layer (30) is braided, containing three insulated copper wires (31) and one housed fiber optic cable (32), with a pitch of approximately 2.5 inches. While the embodiment of the invention set forth in FIG. 3b utilizes a braided intermediate layer containing three electrical wires and one optic cable, the intermediate layer may be one or more electrical wires, one or more optical cables, and yarns wrapped around the core (10). Similarly, the intermediate layer may include any suitable pitch angle. The outer layer (40) is preferably a braid of nylon.

In the embodiment of the invention shown in FIG. 3b, the weight of the tether (1) is approximately 23 pounds per thousand feet, and has been tested up to 1200 pounds of tension. The tether (1) strained under testing up to 2.5-3.0% during which none of the electrical wires (31) or the optical fiber (32) failed. Additionally, a signal was measured as it was transmitted through the optical fiber (32) during testing. Under high material strain, it is expected that the signal will be significantly attenuated, but it was not in this case.

While the tether of the present invention generally consists of at least four concentric layers, namely a high strength inner core, a compaction layer, an intermediate layer including at least one signal conducting component, and a protective outer layer, each layer may be made with different numbers of fibers orientated in various ways, such as braided, to produce the desired strength, weight, and functionality for a particular application. The following specific examples of embodiments of the invention provide a high strength and light weight tether in which the effective strain of failure of the signal conducting components is less than or equal to the failure strain of the entire tether.

EXAMPLE 1

A tether was constructed as follows:

A single Kevlar™ yarn in the center of the core;

16 yarns twisted around the single central yarn with core twist in the opposite direction from yarn twist;

The pitch of yarn twist in the core of about 0.66 inches;

A tight 12 Kevlar™ yarn braid in the first overbraid;

16 yarn diamond braid, including the fiber optic strand, three electrical conductors and 12 Kevlar (™) yarns in the second overbraid; and A 16 yarn nylon "carpet yarn" overbraid for protection of the interior components.

The tether as tested to 1000 pounds load without loss of optical or electrical signal carrying capability.

EXAMPLE 2

A tether was constructed as follows:

A central core of 17 twisted Kevlar™ strands;

A tight overbraid of 16 Kevlar™ strands;

A loose overbraid of 3 electrical conductors, one fiber optic strand, and 12 Kevlar™ strands; and A protective overbraid of 16 nylon strands.

The foregoing description of the present invention has been presented to illustrate the principles of the invention and not to limit the invention to the particular embodiments illustrated. It is intended that the scope of the invention be defined by all of the embodiments encompassed within the following claims and their equivalents.

We claim:

1. A cable tether for connecting a movable powered vehicle to a base structure, comprising:
    a core including a plurality of high-strength yarns;
    a first intermediate layer surrounding and binding the yarns of the core;
    a second intermediate layer surrounding the first intermediate layer, the second intermediate layer including a plurality of spaced conductors selected from a group of conductors including insulated electrical conducting wires and optical fibers that are arranged helically about the first intermediate layer and the core; and
    an outer layer surrounding the second intermediate layer.

2. The cable tether of claim 1, further comprising a third intermediate layer surrounding the second intermediate layer and maintaining a spacing and pitch angle of the plurality of electrical conductors helically arranged about the first intermediate layer and the core.

3. The cable tether of claim 1, wherein the plurality of high-strength yarns include a number of high strength yarns being twisted around one axial high-strength yarn, the number of high strength yarns being twisted in one direction prior to construction of the cable tether and then twisted in an opposite direction about the axial high-strength yarn.

4. The cable tether of claim 1, wherein said first intermediate layer is braided over the core.

5. The cable tether of claim 1, wherein the plurality of conductors includes at least two insulated electrical conducting wires which are spaced from one another along the second intermediate layer and which are helically arranged in the same direction about the first intermediate layer and the core.

6. The cable tether of claim 5, including at least one optical fiber helically arranged in the same direction as the insulted electrical conducting wires about the first intermediate layer and the core.

7. The cable tether of claim 1, wherein said second intermediate layer is braided about the first intermediate layer and further includes at least one braider yarn helically arranged in a direction opposite a helical direction of the plurality of conductors to interlace with the plurality of conductors to thereby maintain a spacing and pitch angle of the plurality of conductors.

8. The cable tether of claim 6, wherein the second intermediate layer is braided and further includes at least one braider yarn helically arranged in a direction opposite a helical direction of the at least two insulated electrical conducting wires to interlace with the at least two insulated electrical conducting wires and at least one optical fiber to maintain a spacing and pitch angle of the at least two insulated electrical conducting wires and the at least one optical fiber.

9. The cable tether of claim 1, wherein the first intermediate layer is wrapped over the core.

10. The cable tether of claim 1, wherein the first intermediate layer is extruded over the core.

11. The cable tether of claim 1, wherein the outer layer is formed of a material that is not subject to degradation when exposed to ultraviolet radiation.

12. A method for securing an airborne power generating device to the ground, the method comprising:
    providing a tether capable of transmitting power and a communication signal, the tether including a core made up of high-strength yarns, a first intermediate layer surrounding and binding the core; a second intermediate layer surrounding the first intermediate layer and having a plurality of conductors selected from a group of conductors including insulated electrical conducting wires and optical fibers helically arranged in the same direction about the first intermediate layer and the core, wherein at least one conducting wire transmits power and at least one optical fiber transmits a communication signal, and an outer layer surrounding the second intermediate layer;
    securing a first end of the tether to an airborne power generating device; and
    securing a second end of the tether to a base on the ground.

13. The method of claim 12, wherein the tether further includes a third intermediate layer surrounding the second intermediate layer and maintaining a spacing and pitch angle of the plurality of conductors helically arranged about the intermediate layer and the core.

14. The method of claim 12, wherein the core of the tether is made up of a plurality of high-strength yarns twisted around one axial high-strength yarn, the plurality of yarns being twisted in one direction prior to construction of the tether and then twisted in an opposite direction about the axial high-strength yarn.

15. The method of claim 12, wherein the second intermediate layer of the tether is braided and further has at least one braider yarn is helically arranged in a direction opposite a helical direction of the plurality of conductors to interlace with the plurality of conductors and maintain the spacing and pitch angle of the plurality of conductors.

16. A method for manufacturing an electro-optical-mechanical cable tether, the method comprising:
    forming a high-strength core by providing at least one axial high-strength fiber and twisting a plurality of high-strength fibers about the at least one axial high-strength fiber;
    binding the core by forming a first compressive intermediate layer around the core;
    forming a second intermediate layer around the first intermediate layer, wherein the second intermediate layer includes at least two fibers helically arranged in the same direction about the first intermediate layer and the core; and
    forming an outer layer that is not subject to degradation when exposed to ultraviolet radiation around the second intermediate layer.

17. The method of claim 16, wherein the first intermediate layer is braided, wrapped, or extruded around the core.

18. The method of claim 16, wherein the second intermediate layer further includes at least one braider yarn helically arranged in a direction opposite a helical direction of the at least two conducting fibers to interlace with the at least two conducting fibers and maintain a spacing between and pitch angle of the at least two conducting fibers and wherein the second intermediate layer is braided or twisted around the first intermediate layer.

19. The method of claim 16, wherein the outer layer is braided or extruded over the second intermediate layer.

* * * * *